Nov. 10, 1964     G. J. WICKSALL     3,156,391

FILM DISPENSER GUARD AND POSITIONING DEVICE

Filed Aug. 30, 1962     3 Sheets-Sheet 1

GUY J. WICKSALL
INVENTOR

BY E. J. Berry

ATTORNEY

Nov. 10, 1964      G. J. WICKSALL      3,156,391
FILM DISPENSER GUARD AND POSITIONING DEVICE
Filed Aug. 30, 1962      3 Sheets-Sheet 2

GUY J. WICKSALL
INVENTOR

BY E. J. Berry

ATTORNEY

Nov. 10, 1964   G. J. WICKSALL   3,156,391
FILM DISPENSER GUARD AND POSITIONING DEVICE
Filed Aug. 30, 1962   3 Sheets-Sheet 3
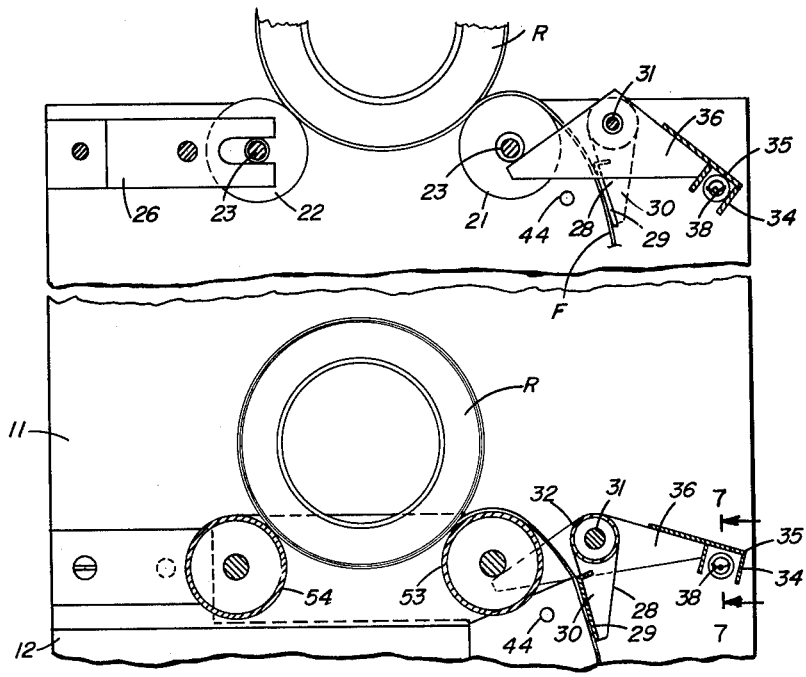
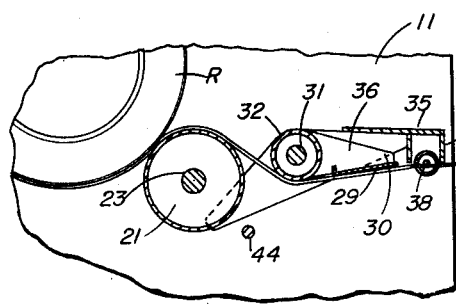
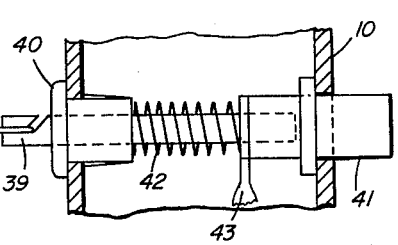
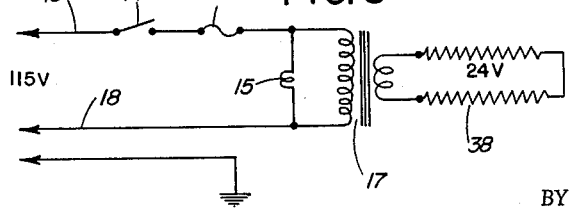
GUY J. WICKSALL
INVENTOR
BY *E. J. Berry*
ATTORNEY

United States Patent Office 3,156,391
Patented Nov. 10, 1964

3,156,391
FILM DISPENSER GUARD AND POSITIONING
DEVICE
Guy J. Wicksall, Canandaigua, N.Y., assignor to National
Distillers and Chemical Corporation, New York, N.Y.,
a corporation of Virginia
Filed Aug. 30, 1962, Ser. No. 220,459
4 Claims. (Cl. 225—34)

This invention relates to commodity packaging and more particularly to a dispenser for relatively thin thermoplastic films commonly used in supermarkets and elsewhere for wrapping products of various sizes and shapes in such a manner that the product is displayed yet sealed within the package.

The desirability of using thin and transparent thermoplastic films for the packaging of various commodities, including meats, has been recognized. However, unlike paper and foil packaging materials, thermoplastic material is not readily severable by a simple tearing or cutting operation. As a result, it has been desirable to provide severance means, such as a narrow heated member or the like, with which the film is brought into contact in order to detach a desired length. However, the presence of an element such as a knife or a wire, which is heated to a temperature adequate to readily sever the plastic material, has presented serious safety hazards. Furthermore, because of the lightness in weight of such film and its tendency to be attracted to objects due to static electricity, there have resulted difficulties in positioning the thermoplastic sheet material for ready grasping in order to dispense a desired length thereof.

Accordingly, it is an object of the present invention to provide a dispenser for thin polyolefin film, such as polyethylene, polypropylene, and the like, which positions the film conveniently for an operator and with its loose end maintained in position for convenient grasping and having a heated severing element adjacent thereto in a position whereby the operator may readily raise the film into engagement therewith and in which the severing element has a movable guard protecting the operator from injury as a result of inadvertent contact with such severing member.

These and other objects of the invention will become apparent from the following description in conjunction with the accompanying drawings, in which:

FIGURE 5 is a sectional view on an enlarged scale taken on the line 5—5 of FIGURE 1;

FIGURE 6 is a fragmentary sectional view similar to FIGURE 5 and illustrating the lifting of the film locator and guard by the film raised into engagement with the hot wire cutter;

FIGURE 7 is a fragmentary detail view illustrating the mounting at one extremity of the hot wire cutter; and FIGURE 8 is a circuit diagram of the connections to the hot wire cutter.

Figure 1:
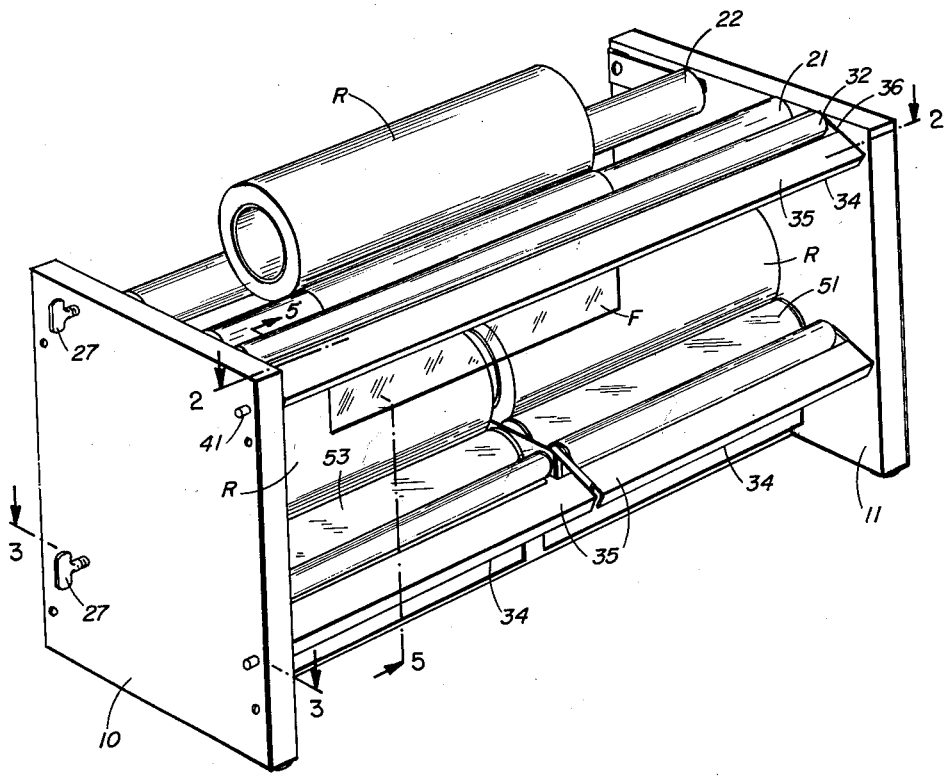
FIGURE 1 is a perspective view of apparatus embodying the present invention.
Figure 2:
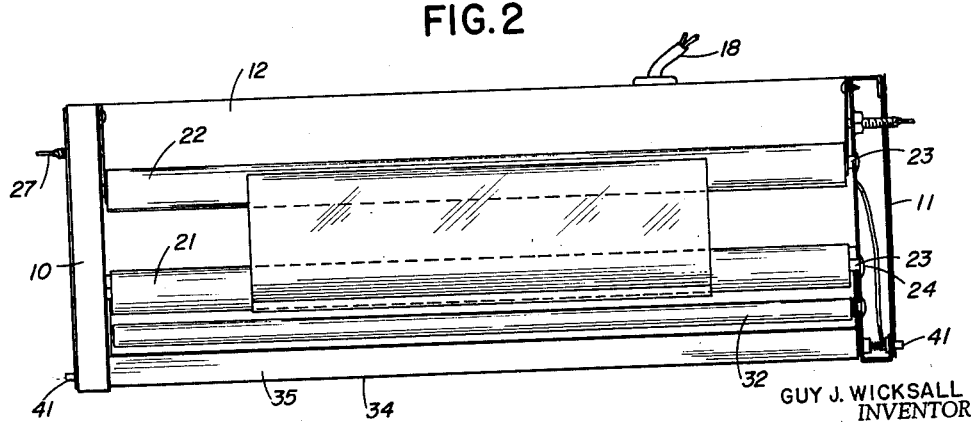
FIGURE 2 is a sectional view taken on the line 2—2 of FIGURE 1.
Figure 3:
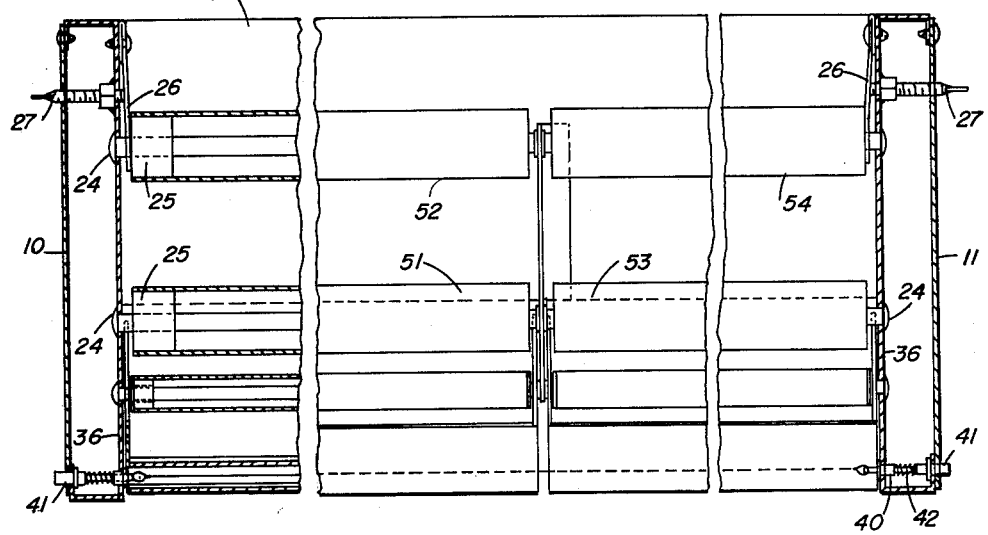
FIGURE 3 is a sectional view taken on the line 3—3 of FIGURE 1.
Figure 4:
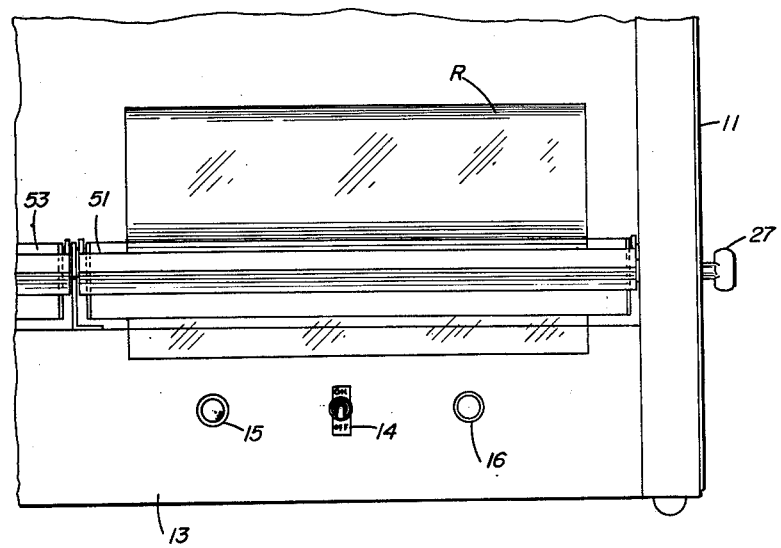
FIGURE 4 is a fragmentary front elevational view on an enlarged scale showing the lower portion of the device.

Briefly stated, the present invention includes a support for one or more pairs of rollers spaced to support a roll of film in convenient position for use by an operator, the support having a depending swingable plate member or film locator mounted forwardly of the forward roller which attracts the free end portion of the film and holds it in position to facilitate grasping by the operator, and a thin severing element such as a high resistance wire to which electric current is applied positioned adjacent the locator and having a swingable guide which normally rests in a position in which it substantially encloses the wire from above and which is raised by the operator's removing film from the roll and lifting it against the guard until the film engages the hot wire.

With further reference to the drawings, there is illustrated a frame including side box-type panel members 10 and 11, connected at their lower rear portions by housing 12 and a front panel 13 on which switch 14, indicator light 15, and fuse holder 16 are mounted. Electrical components such as miscellaneous wiring and transformer 17 are within the housing, leads 18 extending from its rear.

Although the invention contemplates supporting means for dispensing various numbers and sizes of rolls of thermoplastic film, the present invention provides for the mounting of three rolls of different widths. In order to accomplish this, front and rear rollers 21 and 22 are mounted on shafts 23, secured as indicated at 24 to the inner walls of the side panels, the rollers being mounted by bearings 25 for substantially frictionless rotation on said shafts. The rollers are spaced apart a distance appropriate to feed a roll R of thermoplastic sheet material which may be of a width substantially as great as the length of the rollers 21 and 22. The free end of the film feeds from under the roll and over the roller 21 as indicated in FIGURE 5. The operator grasps the free end and pulls the desired length from the roll and then severs it by raising it into contact with the hot wire cutter presently to be described. To prevent inertia from feeding an excess of film a friction drag brake, bifurcated spring leaf member 26, is secured to the inner wall of the panel member adjacent to each end of roller 22 and adjustably urged by thumbscrew 27 into engagement with the bearing 25 in the end of such roller.

In order to facilitate the grasping of the free end of the film, a film locator 28 is provided. The film locator has a longitudinal central plate portion 29 swingably mounted by end brackets 30 on shaft 31. The shaft may, if desired, have a roller 32 mounted thereon, at substantially the level of rollers 21, 22. The plate portion 29 preferably is inclined as indicated to more readily engage the free end of the film and to decrease the resistance to raising the locator when the film is being lifted into engagement with the cutter members, to be described.

Mounted in front of and substantially on a level with the rollers 21, 22 and 32 is a guard member 34. The guard member has a longitudinal housing portion 35 and side brackets 36. The brackets are swingably mounted on shaft 31, the housing portion 35 being gravity biased downwardly. Extending between the side panels is a high resistance wire 38 mounted looped at its end over a notch in rod 39. Rod 39 slides in bushing 40 mounted in the inner panel wall, and its other end is attached to knob 41 slideably received in the outer wall of the panel. Coil spring 42 around the rod urges it outwardly to maintain the wire under appropriate tension. Lead 43 connected to the rod extends to the source of power.

In order to position the guard member to prevent the same from contacting the wire the opposite ends of the brackets 36 remote from the guard member 34 engage shaft 23 when the guard is in its lowermost position in which it shields the wire against accidental contact. The guard may be lifted by engagement of the film therewith (see FIGURE 6) until the film contacts the wire and is thereby severed. Rod stops 44 on the panels are positioned to prevent over-travel of the guard member.

After severance, the free end of the film attached to the roll is engaged by the film locator and urged downwardly to a position in which it depends downwardly therefrom.

Thus, in operation, the operator grasps the film, pulls off the desired amount, raises the film to lift both the film locator and the guard until the film contacts the hot wire. This may be done in a simple, easy motion, and the free end of the film extending from the roll is always in position for easy grasping. Due to static electricity, the film is attracted to the film locator and thus the portion extending therebeyond is in readily accessible position.

The illustrated embodiment of the invention, in addition to the rollers 21, 22 for supporting a relatively long roll of film, also includes front and rear rollers 51, 52 and 53, 54 mounted beneath the rollers 21, 22. The lower rollers are mounted on shafts similarly to the upper rollers and are axially spaced for independent rotation, the forward rollers being spaced from the rear rollers a distance appropriate for supporting a roll of film. Similarly, the film locator, the hot wire guard and the hot wire itself are mounted with respect to the lower rollers substantially the same as with the upper rollers 21, 22. In view of the difference in elevation of the lower rollers and the upper rollers, the operator will tend to pull the film upwardly at a different angle, and accordingly the stop for the hot wire guard for the lower rollers is positioned so that the guard is more nearly horizontal than in the case of the upper rollers, as indicated in the drawings.

Accordingly, it will be understood that the invention includes a frame on which rollers are mounted for rotatably mounting one or more rolls of film, a film locator is mounted forwardly of the front rollers, a cutting wire is mounted forwardly of the film locator, the film locator has a depending swingable plate portion and the wire has a swingable guard so that film may be pulled off the roll and lifted against the locator and the guard, raising both and engaging the wire so that the selected length is severed, and the guard thereupon moving into position to shield the wire, and the film locator attracting the depending portion of the film adjacent thereto and returning to its previous position with the free end of the film projecting therebeneath for convenient grasping by the operator.

There has thus been described a novel dispenser for thermoplastic films, and a novel method for automatically severing desired lengths of such film from a roll thereof.

While in the apparatus illustrated and described, thermoplastic film in flat sheet form has been exemplified, it will be understood that the inventive concept is not thus limited since film in single or multiple sheet or in other pre-fabricated forms may be dispensed in the manner taught with equal facility. Similarly, in connection with the apparatus which has been illustrated and described, various structural modifications may be undertaken.

Thus, the invention is not considered limited by that which is shown in the drawings and described in the specification and reference is had to the appended claims for summaries of the essential features of the invention including novel features of construction, novel combinations of parts, and novel method of operation, for all of which protection is desired.

What is claimed is:

1. A dispenser for thermoplastic film, comprising a frame having side members, a pair of parallel substantially horizontal rollers on shafts journalled rotatably mounted at the same level between said side members, a rod extending between the side members and substantially on a level with and at one side of said rollers, a film locator member rotatably mounted on said rod and depending downwardly, a high resistance wire extending between said side members at approximately the level of said rollers and on the other side of said locator member, a guard mounted above said wire, said guard having a bracket portion and a shielding portion, said shielding portion substantially encompassing said wire when the guard is in the lower position, the extremity of said bracket portion remote from said shielding portion engaging the shaft of the adjacent horizontal roller and said guard in said lower position out of contact with said wire, said guard being biased into said lowermost position and being shiftable into said upper position with said wire exposed, whereby a roll of film supported on said rollers and having its free end hanging downwardly between a roller and said locator member may be readily grasped, a desired length pulled from said roll and the film raised, thereby causing the film locator and the guard to lift, whereby the film engages the hot wire and is thereby severed.

2. A film dispenser as set forth in claim 1, in which said locator is mounted on a rod bearing between the side members of the frame and the film guard is mounted on side brackets supported on the rod on which the locator is mounted.

3. A film dispenser as set forth in claim 2, said rollers being mounted at an elevated position in said frame, a pair of shafts mounted beneath said rollers at a lower position in said frame, said shafts being at substantially the same level, first and second pairs of rollers mounted on said shafts, said first pair of rollers being of a length different from said second pair, whereby at least three different widths of rolls may be supported, and film locating, film severing and severing guard means positioned adjacent to said lower roll, whereby the rolls of film supported on said lower rollers may be dispensed.

4. A dispenser for thermoplastic film comprising a frame having opposed side members, at least one pair of parallel and horizontally disposed rollers rotatably mounted at the same level on shafts journalled in said side members, a rod extending between said side members and located to one side of said rollers and on a horizontal plane slightly above that of said rollers, a first pair of end brackets swingably mounted on said rod, a downwardly depending plate-like film locator member carried by said first pair of end brackets, a heated high resistance wire extending between said side members at approximately the level of said rollers and on the other side of said film locator member, a second pair of end brackets swingably mounted on said rod, and a guard mounted upon said second pair of brackets adjacent the forward extremities thereof, said guard including portions shielding opposite sides of said high resistance wire to substantially encompass said wire when said guard is in a lowermost position, the opposed extremities of said second pair of end brackets engaging beneath the shaft on which the adjacent roller is mounted to support said guard in said lowermost position out of contact with said high resistance wire, said guard being gravity biased into said lowermost position and being movable into an upper position with said wire exposed, whereby the free extremity of a roll of film supported on said rollers and depending between one of said rollers and said locator member may be readily grasped and a desired length pulled from said roll and raised, thereby lifting the film locator and the high resistance wire guard whereby the film contacts said heated wire and is severed.

References Cited in the file of this patent
UNITED STATES PATENTS

| | | |
|---|---|---|
| 1,231,415 | Nebergall | June 26, 1917 |
| 1,447,594 | Mackrodt | Mar. 6, 1923 |
| 2,429,944 | Rayburn et al. | Oct. 28, 1947 |
| 2,730,310 | Schultz | Jan. 10, 1956 |
| 2,800,180 | Jensen | July 23, 1957 |
| 2,839,255 | Guyer | June 17, 1958 |
| 2,945,910 | Moncrieff | Oct. 4, 1960 |
| 2,987,864 | Miller | June 13, 1961 |